(12) United States Patent
Alivandi (10) Patent No.: US 8,401,913 B2
(45) Date of Patent: Mar. 19, 2013

(54) SYSTEM AND METHOD FOR PRODUCING CUSTOM MERCHANDISE FROM A VIRTUAL ENVIRONMENT

(76) Inventor: Besjon Alivandi, Belmont, MA (US)

( * ) Notice: Subject to any disclaimer, the term of this patent is extended or adjusted under 35 U.S.C. 154(b) by 0 days.

(21) Appl. No.: 13/199,883

(22) Filed: Sep. 12, 2011

(65) Prior Publication Data
US 2012/0130846 A1     May 24, 2012

Related U.S. Application Data

(63) Continuation of application No. 12/804,294, filed on Jul. 19, 2010, now Pat. No. 8,019,654, and a continuation of application No. 11/056,902, filed on Feb. 11, 2005, now Pat. No. 7,761,339.

(60) Provisional application No. 60/544,909, filed on Feb. 12, 2004.

(51) Int. Cl.
*G06Q 30/00*     (2006.01)

(52) U.S. Cl. .................................................. 705/26.1

(58) Field of Classification Search .................. 705/26.1
See application file for complete search history.

(56) References Cited

U.S. PATENT DOCUMENTS

| | | | |
|---|---|---|---|
| 5,411,259 A | 5/1995 | Pearson et al. |
| 5,662,332 A | 9/1997 | Garfield |
| 5,964,660 A | 10/1999 | James et al. |
| 6,196,920 B1 | 3/2001 | Spaur et al. |
| 6,200,216 B1 | 3/2001 | Peppel |
| 6,306,035 B1 | 10/2001 | Kelly et al. |
| 6,443,843 B1 | 9/2002 | Walker et al. |
| 6,468,162 B1 | 10/2002 | Nakamura |
| RE37,957 E | 1/2003 | Garfield |
| 6,546,400 B1 | 4/2003 | Aberson |
| 6,665,587 B2 | 12/2003 | Leone, III et al. |
| 7,761,339 B2 | 7/2010 | Alivandi |
| 7,862,428 B2 * | 1/2011 | Borge .............................. 463/29 |
| 8,019,654 B2 | 9/2011 | Alivandi |
| 2002/0082067 A1 | 6/2002 | Mckay et al. |
| 2003/0037075 A1* | 2/2003 | Hannigan et al. ............. 707/500 |
| 2005/0182648 A1 | 8/2005 | Shaw et al. |

FOREIGN PATENT DOCUMENTS

| | | |
|---|---|---|
| EP | 1 342 490 A1 | 9/2003 |
| JP | 2001-087558 | 3/2001 |
| JP | 2001-184185 | 7/2001 |
| JP | 2002-325965 | 11/2002 |
| JP | 2002-360935 | 12/2002 |
| JP | 2003-169962 | 6/2003 |

OTHER PUBLICATIONS

Bits & Bytes; Herald, Calgary; Jun 23, 1998; http://search.proquest.com/docview/244660238?accountid=14753.*
These Bodies are FREE, so get one NOW!: Advertising & Branding in Social Virtual Worlds, published Apr. 2004, based on a presentation given at the 2003 Interactive Media Forum: Identity & Cultures in Cyberspace, Miami University in Oxford, Ohio, Oct. 27, 2003 or onlilne at www.virtualworldreview.com/papers/adbrand.pdf.
Calgary Herald; Bits & Bytes, Calgary, Alta.: Jun 23, 1998. p. CO.02 http://proquest.umi.com/pqdweb?did=196037931&sid=4&Fmt=3&clientId=19649&RQT=309&VName=PQD.
Janssen, Craig, Article to post on Rec.games.frp.announce. Found in web site: www.hoboes.com/pub/Role-Playing/Future/Traveller/Marc%20Miller%Interview. Interview with Marc Miller of Traveller fame, Jul. 1996.

(Continued)

*Primary Examiner* — Mila Airapetian (57) ABSTRACT

Systems and methods are provided for producing merchandise for a user based upon a character within a virtual environment, on request of the user, by retrieving character data representing a player character within a game and converting the character data into merchandise characteristics. Merchandise is manufactured based, at least in part, on the merchandise characteristics.

16 Claims, 9 Drawing Sheets

OTHER PUBLICATIONS

"Visual Web Task 4", found in web site: www.lencom/Visual/WTSite.html.

Ren Reynolds; "Commodification of Identity in Online Communities"; Symposium conducted at the A(O),I.R conference: Internet Research 4.0 Broadening the Band, Oct. 16-19, 2003 Toronto, Canada. Available at http://renreynolds.tripod.com/downloads/RReynolds_AoIR_2003.doc.

Paul Chapman, Calgary Herald. Calgary, Alta.: Nov 13, 2004. p. E.4 http://proquest.umi.com.pqdweb?did=739148501&sid=1&Fmt=3&clientId=19649&RQT=309&VName=PDQ.

* cited by examiner

SYSTEM AND METHOD FOR PRODUCING CUSTOM MERCHANDISE FROM A VIRTUAL ENVIRONMENT

RELATED APPLICATIONS

The present application is a continuation of U.S. patent application Ser. No. 12/804,294, which was filed on Jul. 19, 2010 and will issue on Sep. 13, 2011 bearing U.S. Pat. No. 8,019,654, which is a continuation of U.S. patent application Ser. No. 11/056,902, which was filed on Feb. 11, 2005 and issued on Apr. 8, 2008 bearing U.S. Pat. No. 7,761,339 and claims the benefit of U.S. Provisional Application No. 60/544,909, which was filed on Feb. 12, 2004, all of which are incorporated by reference herein.

FIELD OF THE INVENTION

The invention relates to systems and methods for producing merchandise from a virtual environment, and more particularly to a system and method for producing customized merchandise based upon the appearance, attributes and experiences of characters and items they have acquired within the virtual environment of a computer or console game.

BACKGROUND OF THE INVENTION

Presently, personal computer and console based (e.g. Sony's Playstation, Microsoft's XBOX and Nintendo's Gamecube) games allow individuals and/or groups of individuals to explore and interact with a virtual environment. The virtual environments presented in these games are highly detailed and typically present a science fiction, fantasy or historical milieu in which players may interact with the environment, computer controlled entities and other player controlled entities as part of an entertainment simulation of an alternate reality.

Computer gaming, also known as electronic gaming, began as an individual single player experience. Soon thereafter, multiplayer games were created allowing more than one player to play the same game at the same time, either cooperatively to achieve a common goal, as a competition against one another or a mixture of both.

As computers became more powerful and network connectivity (including the Internet) became more prevalent, the complexity of computer games and the number of simultaneous players increased. Today, games such as City of Heroes, Everquest, Star Wars Galaxies, World of Warcraft, Final Fantasy XI and Lineage involve hundreds of thousands of players. These games allow groups of thousands of people to share a virtual experience together by allowing the individual players within the group to interact with each other and the environment of a persistent or semi-persistent virtual world (also referred to as the "game world"). These types of games have become known as Massively Multiplayer Online Games ("MMOG(s)") or Massively Multiplayer Online Role-Playing Game(s) ("MMORPG(s)"), although other variations of the name also exist.

Part of the attraction of an MMORPG, at least for some players, is the ability to create alternate personas for themselves. Often players create one or more characters and have the ability to customize their characters' appearance, physical and mental attributes, and direct the development of the character through decisions made within the virtual environment. For example, a player's character grows and develops over time as it explores and interacts with the environment and other characters within the game world.

For example, within a fantasy themed MMORPG, a player typically can choose to play any of several races such as Elves, Dwarves, Humans, or Ogres. The majority of MMORPGs also allows the player to allocate various physical and mental attributes (e.g., strength, dexterity, constitution, intelligence, wisdom, charisma, etc.) which in turn determines the character's abilities within the virtual environment. A player can further customize his or her character by selecting gender, facial appearance, body type, hair color/styles, skin tone and clothing. The character may be further modified through the selection of weapons, equipment and other accessories. Over time, a character's actions within the environment may also affect the character's attributes and appearance. For example, other genera of MMORPGs may use different non-humanoid representations of the player's presence within the virtual environment.

In one instance, a science fiction-themed MMORPG may provide the player with the ability to customize a spaceship or other vehicle instead of or in addition to a humanoid character used in the fantasy setting. Other MMORPGs may provide the player with the ability to customize various entities within the game world including characters, equipment and even aspects of the environment itself (i.e. the ability for a player to build his or her own castle or space station within a game world).

As a player proceeds within the game, the player may attain additional customization such as new abilities, skills, experience points, items, trophies, clothes, collectibles, or other indicators of advancement or time spent within the virtual environment game world. Even the effects of aging, scars or behavior may be reflected in the character's appearance.

To play a MMORPG, a player installs a computer program (Game Client) and connects to a network of computers (Game System) and other players do the same. For various reasons, including to reduce the risk of cheating and to control the intellectual property within an MMORPG, the Game Client often employs the use of security algorithms, encryption, and End User Licenses that restrict how a player can interact with the Game Client and Game System. Additionally, in most instances, players run their game clients on hardware that is not capable of fully realizing the graphical nature of the Game System. As a further protection against cheating, the data representing a player's character or other entities under the player's control is typically stored on the Game System rather than on the Game Client. While there are various business models for recouping the costs of developing a MMORPG and operating the Game System, players are typically charged a fixed amount to purchase the Game Client software and then pay a monthly fee for access to the Game System.

SUMMARY OF THE INVENTION

At present, there are no systems or methods known to the inventor for players to obtain customized merchandise based upon their characters and experiences within the virtual game world.

It is therefore desirable to have a system and method which can produce various customized merchandise based upon the appearance, attributes and experiences of a player character within a virtual environment (also referred to as the game world). In accordance with an embodiment of the invention, a system and method are employed for generating customized merchandise based upon an entity (a player's character) within a virtual environment including receiving at least one data element from a data set, wherein the data set contains a plurality of data elements defining an entity within a virtual environment. The data element is then translated into at least one merchandise characteristic. Finally, at least one merchandise characteristic is used to customize merchandise.

In accordance with another embodiment of the invention, a system and method are employed to produce customized merchandise for a user (also referred to as a player) based upon a character within a game environment by receiving character data representing a character within a virtual environment and converting the character data into merchandise attributes. The merchandise attributes are then used to create instructions for producing an item of customized merchandise. The system may then produce the merchandise locally or transmit the instructions to another system to manufacture the merchandise. Depending upon the item, the manufacturing instruction may be transmitted to the user requesting the item. For example, a user may wish to have a high resolution image or video (well in excess of the models used for the actual game) of his or her character within the game environment. In the inventive system, the user can take a snapshot of his/her character within the virtual environment, the system then uses the character data and game data to determine the character's position within the environment, the clothing, weapons and equipment the character is using and information about the surrounding environment (including the presence of any environmental effects, spells, monsters or other characters). The system could then use this information in combination with the high resolution models used to develop the game (but which are impractical for use in the game itself) in order to generate a high resolution image or video of the player's character within the environment. In the case of a high resolution image, the image may be printed and the final product sent to the user. Alternatively, the high resolution image or video file could be sent to the user for display of the computer screen or to be printed out on the user's own printer.

In accordance with yet another aspect of the present invention, the transformation of character attributes into merchandise characteristics may include the calculation of new character statistics for use in at least one alternative game system. In one embodiment, character data from a computer role-playing game is used to generate a customized collectible trading card. The collectible trading card can include statistics for use in a collectible trading card game (e.g. Magic the Gathering™). It is also within the scope of the invention to render other game components such as miniatures, statistic cards and player record sheets.

In accordance with another aspect of the present invention, the inventive system can convert the player character record from a first data format to a second data format thereby allowing the player to use a character developed in one virtual environment to be used in another. For example this would allow a player to transport a character developed in a MMORPG to a single player game, other MMORPG (including from one platform to another) or to a pen and paper game system.

In accordance with another embodiment of the invention, a method for generating merchandise, based upon an entity within a virtual environment, is disclosed comprising receiving at least one data element from a data set by at least one processor, wherein the data set contains a plurality of data elements defining attributes of an entity within a virtual environment, translating the at least one data element into at least one merchandise characteristic by at least one processor, and manufacturing electronic merchandise based, at least in part, on the at least one merchandise characteristic. The electronic merchandise may be chosen from the group consisting of an image file, a movie file, a Web site, a video game, a computer program, a translated character record, and a screensaver, for example. The entity may comprise a character from a game conducted in the virtual environment. At least one attribute of the character may change during play of the game, resulting in at least one changed data element, and the method may then comprise translating the at least one changed data element into the at least one merchandise characteristic by the at least one processor, and receiving a request for the electronic merchandise including the at least one changed data element, from a player of the game.

In accordance with another embodiment of the invention, a system for generating merchandise, based upon an entity within a virtual environment, is disclosed comprising an interface to receive at least one data element from a data set, wherein the data set contains a plurality of data elements defining a character within a virtual environment and a processor. The processor is configured to translate the at least one data element into at least one merchandise characteristic, and cause manufacture of electronic merchandise based, at least in part, on the merchandise characteristic.

In accordance with another embodiment of the invention, a system for generating merchandise, based upon an entity within a virtual environment is disclosed comprising means for receiving at least one data element from a data set by at least one processor, wherein the data set contains a plurality of data elements defining attributes of an entity within a virtual environment, means for translating the at least one data element into at least one merchandise characteristic by at least one processor, and means for causing manufacture of merchandise based, at least in part, on the at least one merchandise characteristic.

In accordance with another embodiment of the invention, a system for generating merchandise, based upon an entity within a virtual environment is disclosed comprising an interface to receive at least one data element from a data set, wherein the data set contains a plurality of data elements defining an entity within a virtual environment, and a processor. The processor is configured to translate the at least one data element into at least one merchandise characteristic, and cause manufacture of merchandise based, at least in part, on the merchandise characteristic. The system may further comprise a fabrication device to manufacture the merchandise, such as a printer, milling machinery, laser cutting machinery, water jet machinery, sewing machinery, stitching machinery, and embroidery machinery. The system may further comprise a database storing templates for at least one item of merchandise and the processor may be configured to retrieve the template for the selected item of merchandise based, at least in part, on the selected item, and cause manufacture the item based, at least in part, on the retrieved template.

In accordance with another embodiment of the invention, a method for generating merchandise, based upon an entity within a virtual environment is disclosed comprising creating a game in a virtual environment by a first processor for participation by at least one player via at least one second processor coupled to a network. The method further comprises processing instructions from the at least one second processor to control an entity in the virtual environment, by the first processor, and receiving a request for an item of manufacture from the second processor by the first processor, via a network. The item of manufacture is based, at least in part, on the entity. The request is forwarded by the first processor via a network to a third processor separate from the first and second processors, to cause manufacture of the requested item of merchandise.

In accordance with another embodiment, a method for generating customized merchandise, based upon an entity within a virtual environment is disclosed comprising playing a game in a virtual environment, by a first processor and controlling an entity in the virtual environment by the first processor, while playing the game. The method further comprises sending a request for manufacture of an item of merchandise based, at least in part, on the entity in the virtual environment by the first processor via a network, to a second processor different from the first processor, wherein the second processor causes manufacture of the item.

As will be appreciated by the foregoing, the present invention provides a system and method for producing a customized merchandise including, but not limited to, collectible trading cards, action figures, posters, books, postcards and game components for games not rooted in a virtual environment. The customized merchandise will be based upon some element of the player's character or equipment so as to make it personal to that player. The customized merchandise may be purchased within the virtual environment of the game itself or through an external interface. It will also be understood by one skilled in the art that the inventive system may also be applied to other types of multiplayer games such as first person shooters and simulations as well as single player games.

BRIEF DESCRIPTION OF THE DRAWINGS

Further objects, features and advantages of the invention will become apparent from the following detailed description taken in conjunction with the accompanying drawings showing illustrative embodiments of the invention, in which.

DETAILED DESCRIPTION OF THE PREFERRED EMBODIMENTS

The invention is directed to systems and methods for producing customized merchandise based upon the attributes of a user's virtual entity (also referred to as a player's character) within a virtual environment (a game world). The customized merchandise produced by the present invention may be either tangible (e.g., trading cards, posters, miniatures, action figures, books, patches, t-shirts, stickers) or intangible (e.g., image and movie files, Web sites, translated character records).

Figure 1A:
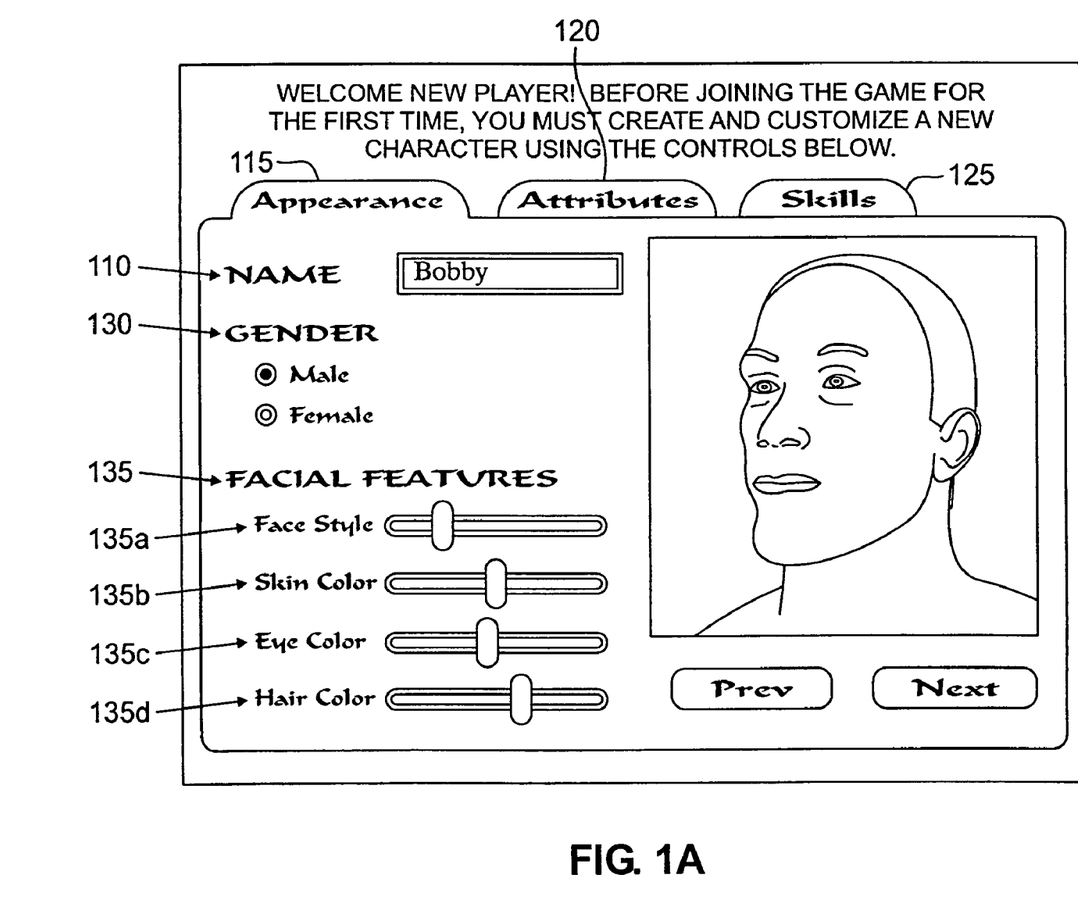
FIG. 1A illustrates a graphical user interface (GUI) of a game client used by a player to create and customize a new character to use within a game, in accordance with an embodiment of the invention.

With reference to FIG. 1A, when a person begins to enter a game for the first time, the player is presented with an interface to create and customize a character. The character the player creates is a personalized representation the player will use to play the game. In multiplayer games, other players can recognize different characters as representing different players since each character has been customized by its respective owner. Similar interfaces are also used in single player games as well.

In this example, the player has decided on the name, "Bobby," for his character and typed it into name field 110. In a MMORPG, character names are usually unique within a game and filtered to be consistent with the policies of the game. Examples of filters include: restrictions on the use of profanity, slang, trademarks, and other undesirable text.

The tabbed interface shows the player customizing the appearance of their character on Appearance tab 115. The interface also shows that attributes and skills related to the character can be customized through selecting the appropriate tab (e.g., Attributes tab 120, Skills tab 125); however, neither of these tabs is detailed here.

Within Appearance tab 115, the player has specified the character's gender 130 and adjusted the character's facial features 135, including facial style 135a, skin color 135b, eye color 135c, and hair color 135d to the player's liking. All of the selected appearance characteristics are stored as data elements within a character record and are used to generate the virtual representation of the player within the virtual environment of the game. As the player adjusts these parameters, a preview of the character is provided within a window on the GUI. This allows the player to see the influence that the different parameters have on the character in real time. The preview greatly enhances the player's ability to customize the character. Many players spend a great deal of time customizing the appearance of their character before entering the game. Different games have different types of characters and have different levels of customizability. Some games do not use humanoid characters to represent players. For example, in a science fiction game, the player's character may be a spaceship. In such a game the player usually can select different ships, alter a ship's design, and change the markings on a ship they have selected.

While some characteristics affect the appearance of a character others are statistical measurements of a character's physical and mental abilities and skills. Additionally, some games may not allow graphical customizations, but instead provide for differentiation of player characters through the development of these nonappearance related characteristics or characteristics that a character acquires at the start of or during the course of playing the game. A few examples of such defining statistics and characteristics include: name, species, color, class, ranks, uniform, allegiances, group affiliation, team membership, strength, number of kills, professions, point totals, and levels. FIG. 1C illustrates some of these statistics and characteristics.

Figure 1B:
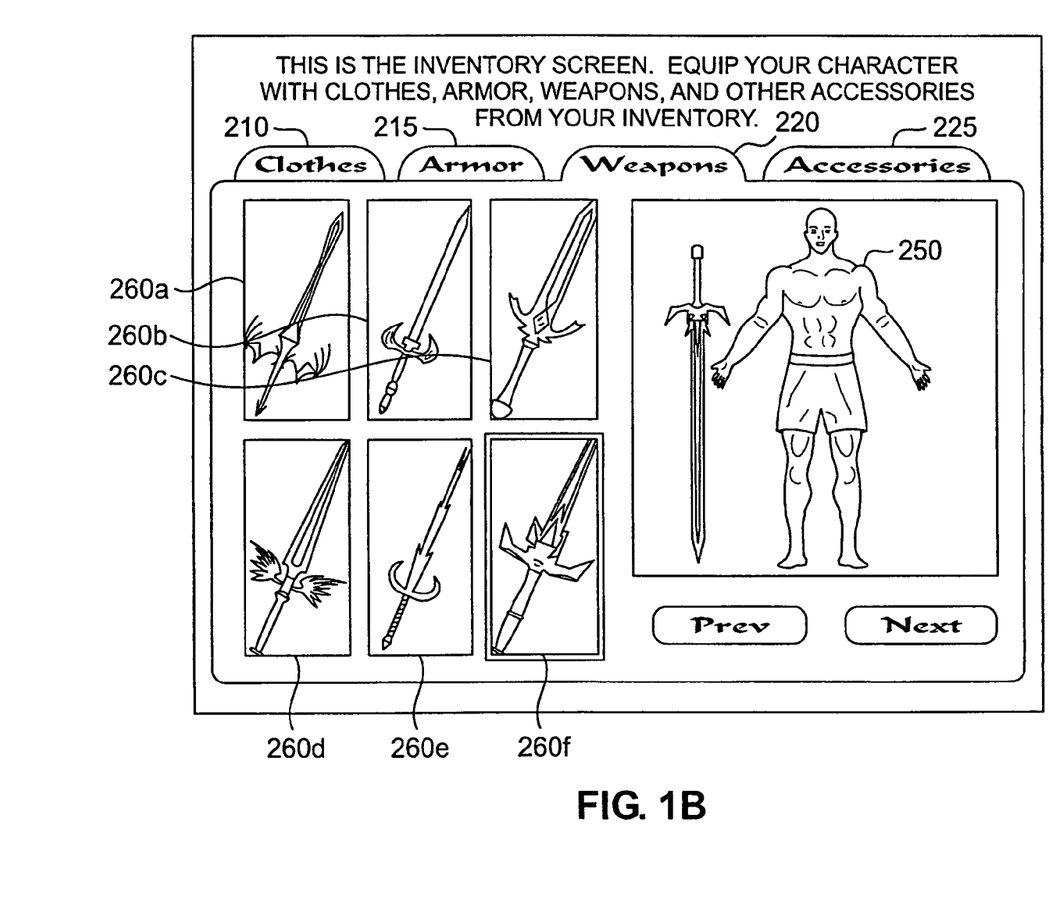
FIG. 1B illustrates a GUI of a game client used, in accordance with an embodiment of the invention, by the player to equip his character with items found within the game.
Figure 1C:
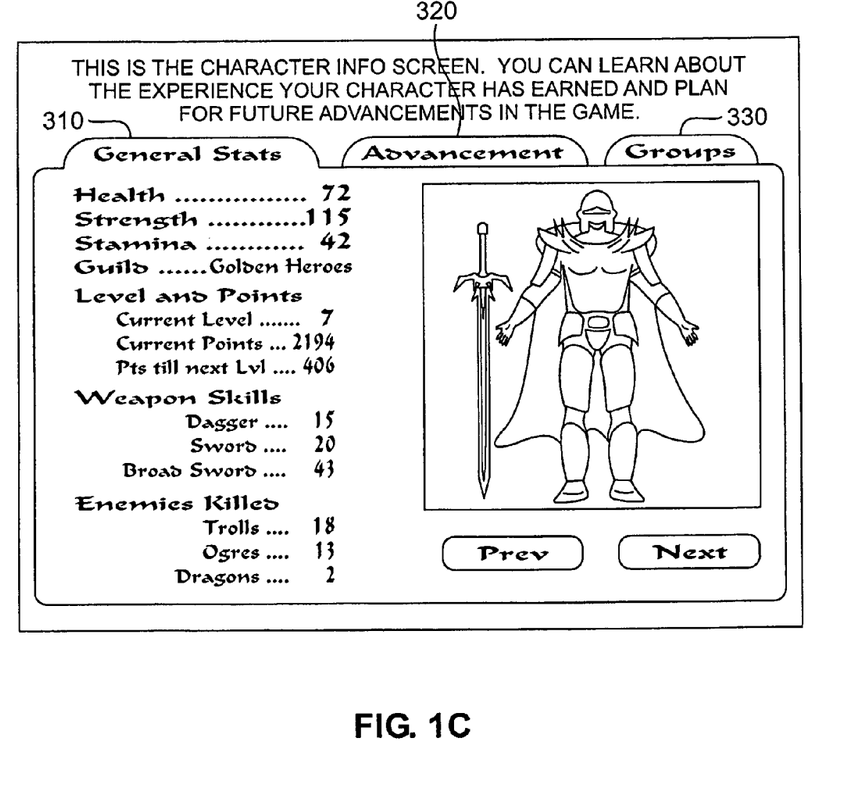
FIG. 1C illustrates a GUI of a game client that, in accordance with an embodiment of the invention, contains statistics about the character within the game.

In reference to FIG. 1B, the player maintains an inventory for the player's character in which clothes 210, armor 215, weapons 220, and other accessories are collected. The inventory is accessed through an interface such as the one shown. As the character progresses through the game it has access to higher-level gear, which is more powerful and effective within the game. The player can review items within the player's inventory and equip the character with an item appropriate to the current game situation. The GUI provided in FIG. 1B shows a "Paper-doll" view of the character 250 where items can be dragged from the inventory on the left to the preview window on the right. As items—in this case, swords 260a through 260f—are selected they will appear either on or next to the character. For example, character 250 is currently not wearing clothes. These may be added, however, from the Clothes tab 210. In a similar fashion, armor and accessories such as a cape could be added by accessing Armor tab 215 or Accessories tab 225, respectively. Management of a character's inventory is a common game mechanic leading to many hours of game play. Players collect, trade, buy, and fight over items to add to their inventory. Games in different genres, such as science fiction, can incorporate items specific to that genre. For example, laser guns may be substituted in place of swords as the standard weapon used by characters within a science fiction-type game. The data describing clothing and other equipment or gear is also stored in the character record.

Many games allow players to craft new items to be bought and sold. For example, a player that creates a character that is skilled in blacksmithing and forging could have his or her character craft new swords provided the character had the raw materials and furnace or blacksmith shop within the game to do so. As these items are created, data describing the item is added to the character record. Some games also allow the users to import customized graphics into a game for use as "skins" for the polygonal models used on their characters and their equipment as well as two dimensional art used for insignia to denote membership within an organization.

With reference to FIG. 1C, as a player plays a game, the player's character collects experience, acquires new skills, advances within the game world, and forms affiliations. This information is available for review by the player to help gauge the progress in the game and to plan for future advancement. The information GUI shown in FIG. 1C illustrates a character and the various statistics and facts about that character. For example, referring to the information provided under General Statistics tab 310, the character has reached the level 7 and has 2194 points. The player-owner of this character needs his character to get 406 more points to reach the next level. In addition, this character is a member of the guild "Golden Heroes." A guild is a group 330 of players that have decided to cooperate with each other in a formal manner. By playing in a group, the members of the group are able to tackle high level monsters or obstacles together that would be difficult or impossible for a single player to attempt on its own. Games often encourage group play by sharing experience points among all members of the group whenever a member of the group gains experience. Games benefit from group play because group play encourages building of communities within the game and aids in retaining players: Players (also sometimes called subscribers when, for example, subscription fees are imposed) are more likely to continue playing the game and paying subscription fees if they have peers/colleagues that are still playing the game. The present invention allows for certain customized merchandise to be made available only to members of a predefined group. Merchandise may be customized to prominently feature logos and/or insignia of a specific clan, guild, party or other organization within a game and only be made available to players who have characters that are members of that organization. As part of the process of ordering merchandise the inventive system may check and see if the user has a character which qualifies him to purchase an item.

Advancements tab 320 enables players to view a GUI that identifies various requirements required to reach the next level of a game. For example, to reach a subsequent game level, a predetermined number of points may be required. In another instance, a predetermined level of health, strength and/or stamina may be required, or certain weapon skills must be attained or a predetermined number of enemies must be killed.

Different games refer to groups 330 of players by using different names depending on the genre and fiction of the game—some examples of different terms for groups include: guild, clan, team, company, player association, corporation, and club.

Different games will also collect and maintain different statistics about a player's character. For example, in a science fiction-themed game the skill of the character with weapons may relate to laser guns and rifles as opposed to daggers and swords as shown in FIG. 1C. Other attributes of the character could also be tracked, such as the profession and the proficiency of the character at the profession. For example, a player could teach his or her character to become a master blacksmith or intermediate bounty hunter or apprentice wizard and have this statistic displayed on the character information GUI.

Figure 2:
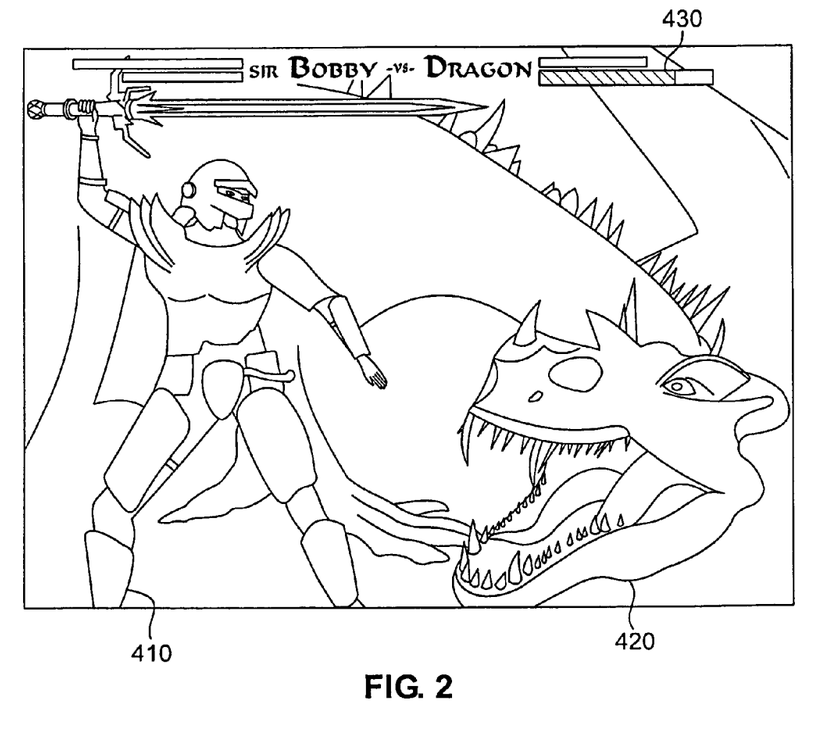
FIG. 2 illustrates a GUI of a game in play depicting the player's character (the knight) battling an enemy (the dragon), in accordance with an embodiment of the invention.

With reference to FIG. 2, a fully-equipped player controlled character, the knight 410, fights an opponent, the dragon 420. Progress meters 430 at the top of the illustration provide feedback to the player allowing the player to monitor the battle and take appropriate action. Most games are competitive in nature where individual players will compete against each other or against nonplayer controlled characters. The term Player versus Player, abbreviated PvP, is used to describe the case where players fight each other and Player versus Environment, abbreviated PvE, is used to describe the case where players do not fight each other, but instead fight opponents controlled by the game. Games are available that mix PvP and PvE and games are also available that are more cooperative than competitive.

In the example depicted, the player, represented by knight 410, is engaged in PvE conflict with dragon 420. As knight 410 battles dragon 420, the player's character is gaining experience points and advancing within the game. By the nature of being a competitive game, the player is also risking the death of his character or at least the loss of some attributes such as experience points or some other measure of advancement should the dragon be victorious. Since attributes or statistics related to the character are affected by the player's actions, the player's character can be considered customized by the actions of the player by way of the decisions the player made in playing the character within the game.

As players play the game with their characters, they often become emotionally invested with the game and specifically with their respective character(s). Some players even write stories about their character(s) and role-play the stories inside the game. The GUI of FIG. 3 provides an interface to allow a player to order merchandise based on the representation of the player's character within the game.

Figure 3:
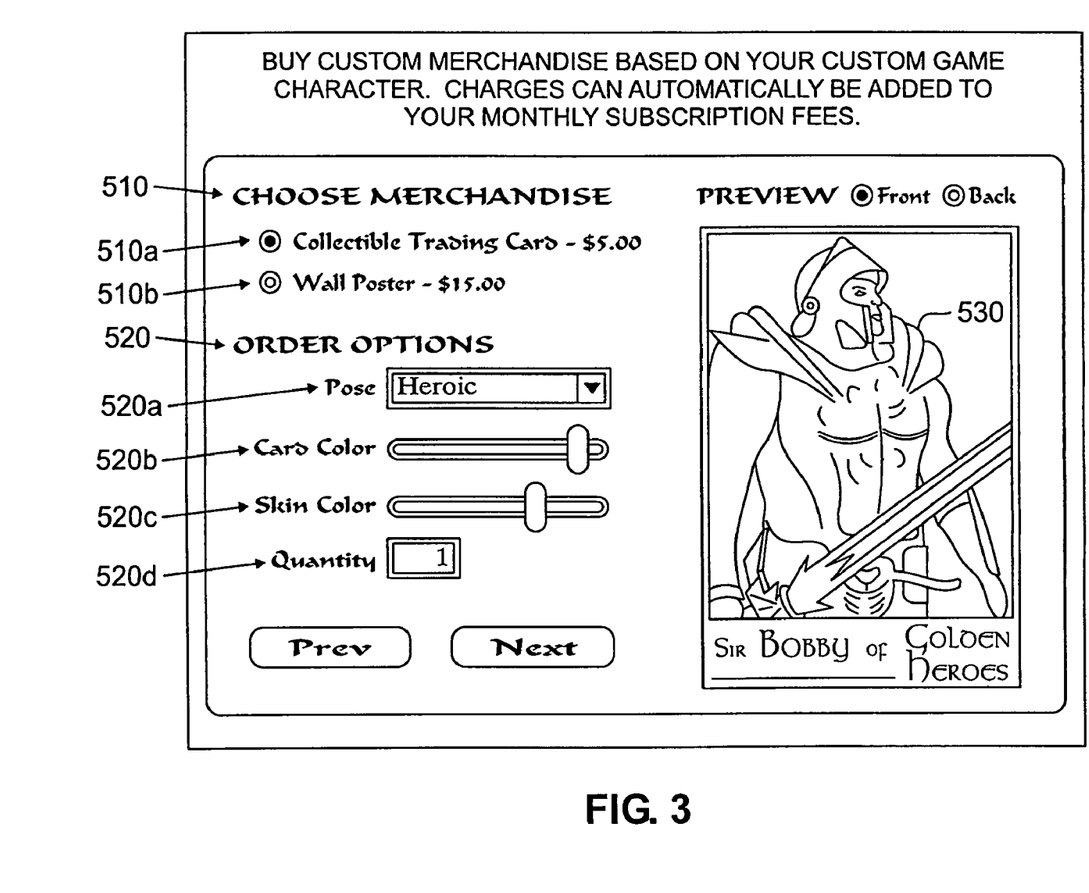
FIG. 3 illustrates a GUI of a game client used by the player to order customized merchandise based on the player's game character, in accordance with an embodiment of the invention.

In the example illustrated by FIG. 3, a player has accessed a GUI within the game client that allows ordering among various merchandise choices 510—e.g., a collectible trading card 510a or a wall poster 510b depicting the player's character. Options 520 are available to further customize the item being ordered. In the case of ordering the collectible trading card the options include: the pose 520a the character should have when the card is printed, the color of the card 520b itself, the color of the background 520c behind the character on the card, and the quantity of cards 520d to order.

A preview 530 of what the ordered item will look like is provided on the right hand side of the interface. In the case of the collectible trading card, the player can choose to examine either the front or the back. The back of the trading card may contain statistics derived from the player's character at the time the order is placed. The front of the card depicts the player's character equipped with the clothes, armor, weapons, and accessories the character currently is equipped with in the game.

When the order is placed, charges may be added to the player's account to be billed at the next installment (e.g., monthly), or charges could be paid immediately via credit card or some other means. While this example illustrates the ability to purchase individual types of merchandise a la carte style, it should be inferred that multiple differing merchandise items could be ordered through the use of a shopping cart system.

Additional customized merchandise based on the customized representation of the player's character could also be made available and is not limited to collectible trading cards 510a or wall posters 510b. Some examples of other merchandise include: t-shirt, trophy, calendar, cup, flag, banner, jacket, bumper sticker, stickpin, badge, hat, stationery, pen, plaque, action figure, doll, bust, model, sculpture, mask, or even including clothing and other accessories resembling those of the customized character. Some examples of electronic merchandise that may be purchased include: an interactive Web site devoted to the character providing a useful entertainment and information venue for the player and associates of the player to gather, a high quality video of the character performing a specific adventure or being the star of a short movie, a screensaver with the character or virtual locations the character has seen, a stand alone video game such as a retro cell phone game, or a software program that uses the character or character data in an interesting way (such as an Instant Messaging client that uses the character's facial expressions in place of emoticons or a newsreader that details events that happen to the character within the originating game). Additionally, the system could provide players with a method of converting a character record from one game system to another.

While FIG. 3 depicts an interface within a game client, it should be noted that the defining characteristic of the interface is not that it is embedded within the game client but that it is a means to order customized merchandise based on the customized representation of a player's character within a game. As such, analogous functionality could be provided through other interfaces such as:

a) An in-game mechanism where a player directs his or her customized character into a structure within the game where a nonplayer character greets the player and, through a series of dialog interchanges between the player controlled character and the nonplayer character, an order is placed for customized merchandise based on the customized representation of the player's character.

b) An external interface such as a Web site where a player may visit and enter specific information allowing the Web site to either access the player's character information or recreating the player's character information and allowing the player to place an order for customized merchandise based on the customized representation of the player's character.

c) A third party program installed on the player's computer that either accesses the player's character information or recreates the player's character information and allows the player to place an order for customized merchandise based on the customized representation of the player's character.

d) An application programming interface, otherwise known as an API, that permits the automated ordering of customized merchandise based on a player's customized representation of the player's character when a predetermined or dynamic condition is met. An example of one such condition is the player reaching a certain rank, level, or milestone within the game and the game automatically ordering and sending to the player the merchandise, at no cost to the player, as a reward for dedication in playing the game and to memorialize the significant accomplishment of the player.

Figure 4A:
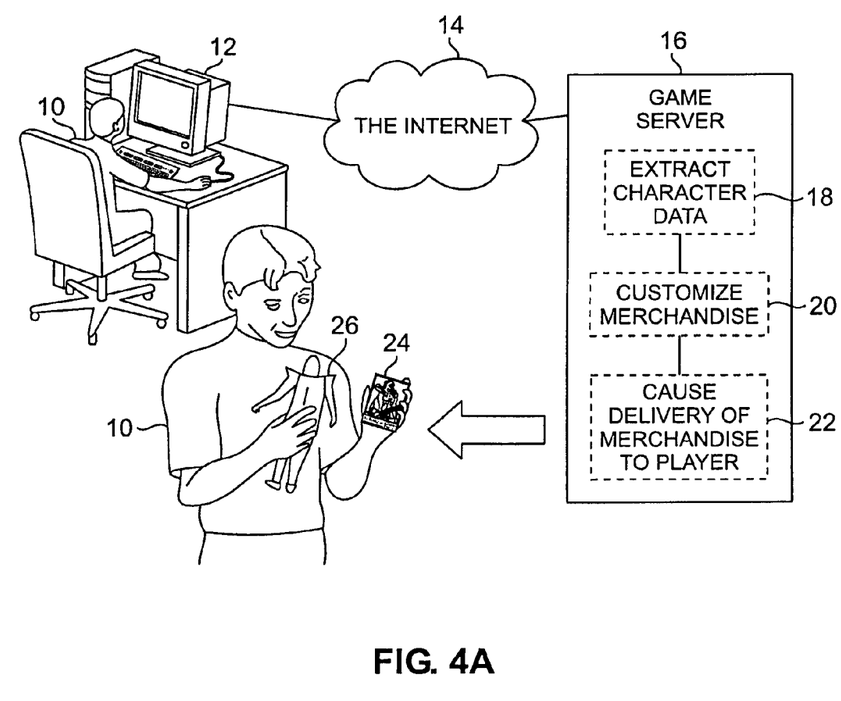
FIG. 4A illustrates the interaction between a player and a system for providing merchandise to a user, in accordance with an embodiment of the invention.

FIG. 4A illustrates the interaction between a player and a system for providing merchandise to a user, in accordance with an embodiment of the invention. With reference to FIG. 4A, a player 10 plays a game on his home computer 12. Within the game, the player uses a character he customized before starting. As he plays, the character advances in the game. The game is connected via the Internet 14 to the game server 16. The player 10 orders customized merchandise based on his customized character. The request is sent from his computer 12, through the Internet 14, to the game servers 16. The appropriate character data associated with the player's character that is needed to complete the order is extracted 18. The merchandise is then customized 20 based on the extracted character data, and delivery 22 is made to player 10.

Figure 4B:
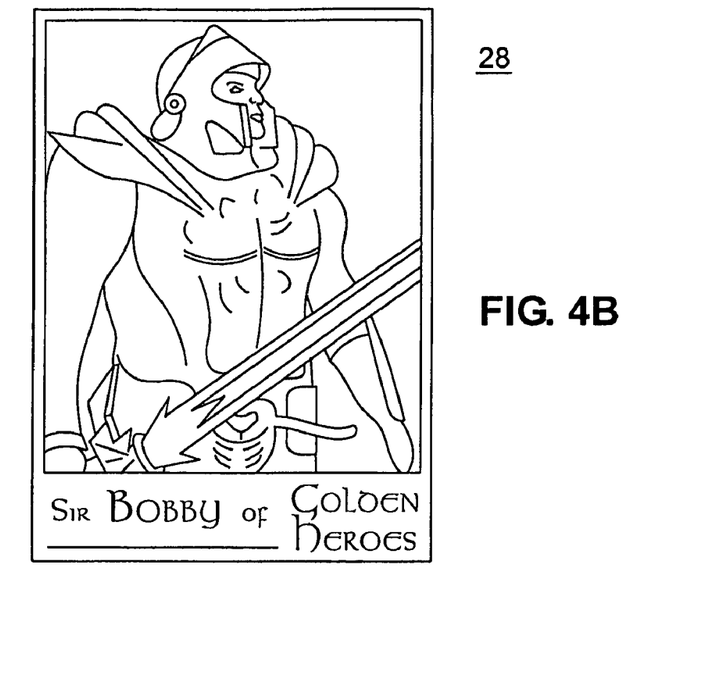
FIG. 4B and FIG. 4C illustrate the front and back, respectively, of a collectible trading card, in accordance with an embodiment of the invention, ordered by a player featuring the name and the likeness of the player's character on the front and statistics about the player on the back.
Figure 4C:
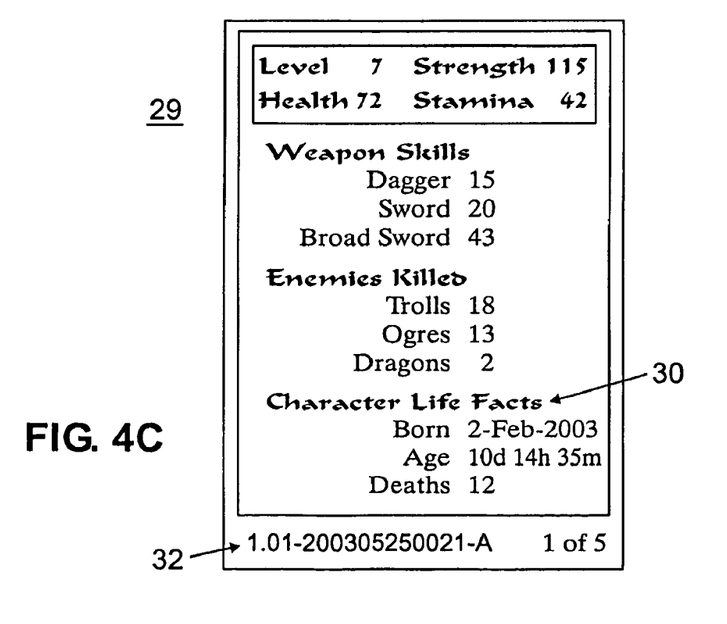

In this example the player 10 holds two pieces of customized merchandise. In his right hand, he holds an action figure doll 26 with the likeness of his customized character. In his left hand, he holds the collectible trading card 24 as he would have customized and ordered using the GUI depicted in FIG. 3. FIG. 4B shows the front detail 28 of the collectible trading card 24 that the player ordered in FIG. 4A. FIG. 4C shows the back detail 29 of the collectible trading card that the player ordered in FIG. 4A.

The front 28 of the trading card is as was presented in the merchandise preview window of FIG. 3. The back of the trading card contains statistics from the game as was seen in FIG. 1C; however, not all the statistics from the GUI presented in FIG. 1C is included on the back of the trading card while additional information not available from the character information GUI of FIG. 1C is included. For example, the information related to the number of points the character currently has and needs to reach the next level is missing and the Character Life Facts 30 section has been added.

As part of the data extraction process shown in FIG. 4A only the relevant data needed to create the merchandise was extracted from the game system. Extra data was ignored while other data that was needed was acquired. The data extracted is based upon the item requested.

The additional information presented on the back of the card 24 can serve many purposes including: incentive for a player to order merchandise, serial and lot numbers for tracking and authentication of collectible merchandise as shown in 32, use in conversion of game statistics for other games or mediums, and information appropriate for the merchandise that may not have been appropriate, redundant, or simply unnecessary to include within the original game.

Figure 5:
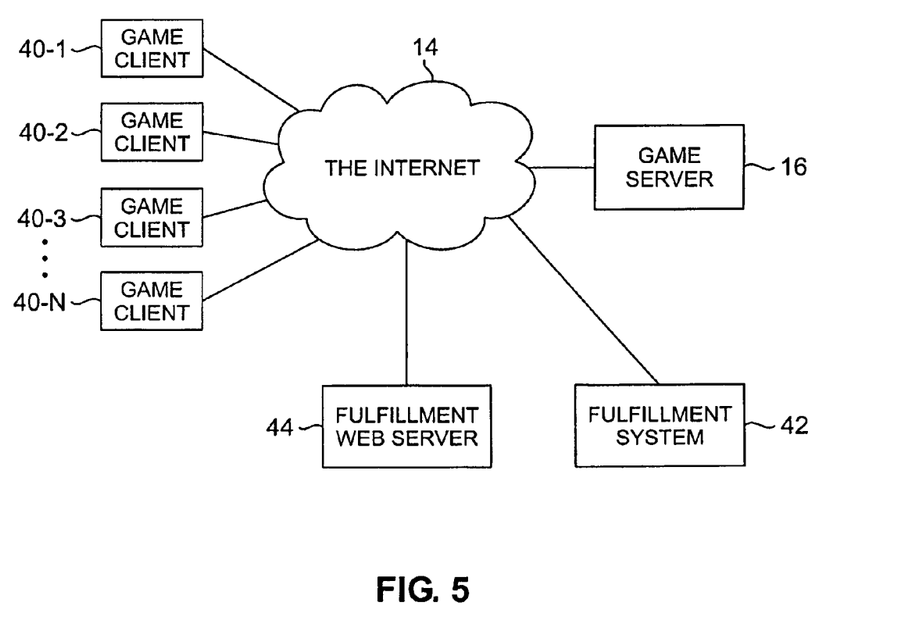
FIG. 5 illustrates the relationships between game clients, the Internet, a game server, a fulfillment web server, and a fulfillment server, in accordance with an embodiment of the invention.

In reference to FIG. 5, multiple game clients 40-1 through 40-N connect to the Internet and connect to the game server 16 to play a multiplayer game. The game clients 40-1 through 40-N exchange messages through the Internet 14 with the game server 16. The same arrangements of game clients can support an alternate configuration where game clients exchange messages with each other through the Internet 14 and bypass the game server 16 to operate in a peer-to-peer manner.

When a player desires to purchase customized merchandise, based on their customized character in the game, several avenues of transmitting that desire to the appropriate fulfillment server 42 are available.

In one scenario, the player's game client, for example client 40-1, transmits a message containing the order details through the Internet 14 to the game server 16, which authenticates and validates the request. The request is then passed through the Internet to the fulfillment system 42 to produce the customized merchandise.

In another scenario, the player connects to a fulfillment web server 44 through the Internet 14. Accessing the fulfillment web server 44, the player enters details about his customized character. The details of the order are then transmitted by the fulfillment web server 44 in a message through the Internet 14 to the fulfillment system 42 where the customized merchandise is produced.

In yet another scenario the player's game client 40 transmits a message containing the order details through the Internet 14 directly to the fulfillment system 42 where the customized merchandise is produced.

Other scenarios are possible in which various elements of this process are substituted with analogous elements that serve similar functions. For example, the communication network used to exchange messages does not have to be the Internet 14; other networks and means of communication are acceptable.

Figure 6:
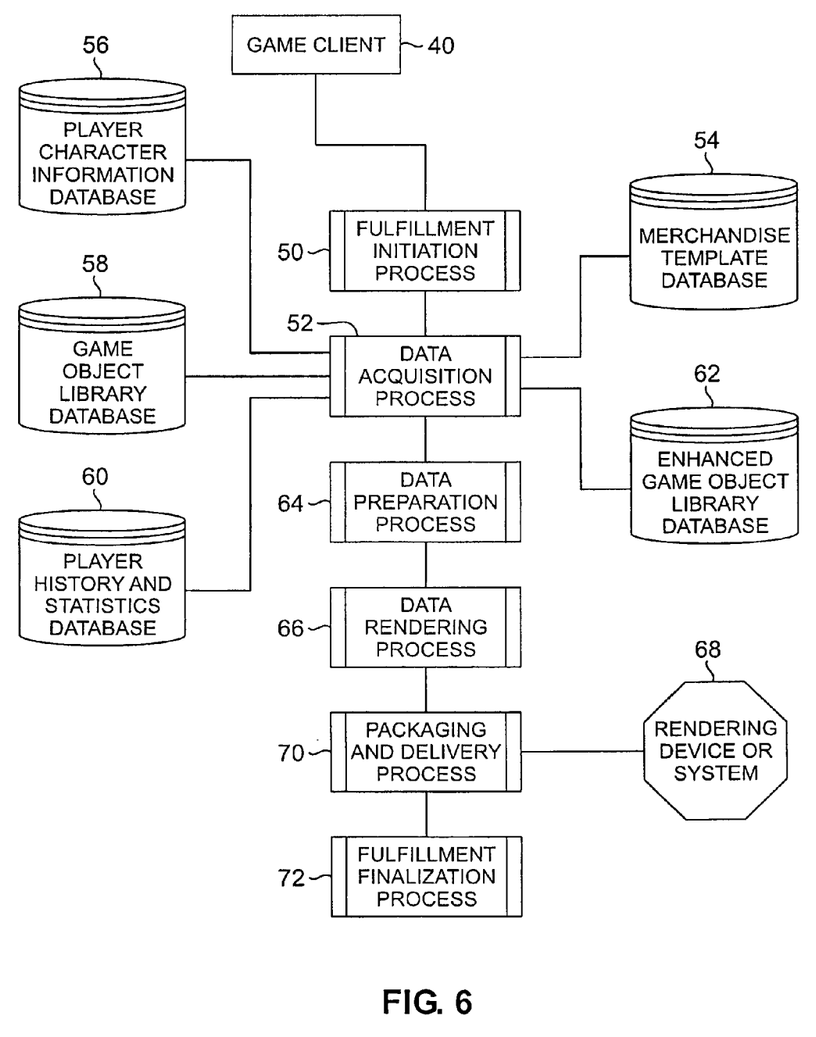
FIG. 6 illustrates the process flow for the fulfillment devices presented in FIG. 5.

In reference to FIG. 6, fulfillment system 42 is described as a series of processes that are executed in sequential order. The order of the processes could be rearranged and individual processes combined or eliminated depending on the requirements of the situation and the merchandise being customized without invalidating the underlying concept of a system composed of processes that render customized merchandise based on data used to represent a customized character.

Furthermore, under certain conditions some processes may be executed in different locations. For example, in the case of a collectible trading card 24, it may be more efficient for the game servers to render the character data into an electronic image file and to pass this file to the fulfillment system 42 for printing onto the physical card media.

In the FIG. 6 depiction of the fulfillment system that a game client 40 operates by a game player requests creation of customized merchandise based on the player's customized game character by transmitting a request message to the Fulfillment Initiation Process 50.

The Fulfillment Initiation Process 50 evaluates and accepts or rejects the request for creation of customized merchandise. Some of the criteria that might be used to determine this include: whether the request comes from a trusted source and whether the request includes the appropriate data necessary to carry out the fulfillment operations.

The data needed to carry out the fulfillment operation may include: location of the customized character information, the format of the customized character information, procedures to access the customized character information, the type of merchandise that is being ordered, the quantity, and a unique identifier used to retrieve further information related to the character. These types of data are more accurately referred to as "meta-data" since it is data used to describe properties and attributes of the order and of the character data that will be needed to complete the order for customized merchandise.

As indicated previously, the request may come from other sources besides the game client 40. For example, the player through an external interface such as a Web site could place an order or the game system itself could place an order.

Further variations include how the order is placed: either using "push" or "pull" technology. "Push" technology is where an external entity, in this case the game client 40, sends a request to a second entity, in this case the Fulfillment Initiation Process 50. "Pull" technology is where one entity, in this case the Fulfillment Initiation Process 50, periodically queries the external entity, in this case the game client 40, to see if the external entity desires an action to take place, in this case the creation of customized merchandise.

After the order has been accepted, the meta-information is transferred to the Data Acquisition Process 52. The Data Acquisition Process examines meta-data and determines what type of merchandise is being requested. Using this information an electronic template for the merchandise to be built is retrieved from the Merchandise Template Database 54. This template specifies, in sufficient detail to produce a given type of merchandise, exactly what data is needed and how it should be formatted.

If the merchandise to be produced is a collectible trading card, the template may include information on the dimensions of the image to be used on the front of the card, how and where to place the character's name on the front of the card, which statistics to include on the back of the card, and how those statistics should be formatted.

Additional information for the manufacturing of the merchandise may be included in the template—for example, the materials, machines, process, and facilities to use in manufacturing the merchandise could be specified in the template.

Based on the template retrieved from the Merchandise Template Database 54, the Data Acquisition Process 52 connects to the Player Character Information Database 56, Game Object Library Database 58, and the Player History and Statistics Database 60 to retrieve the data specified in the template.

The Player Character Database 56 contains data describing customizations players make to their characters. A unique identifier associated with each player and his or her character is used as an index into the database. The index allows efficient retrieval of the customization data the player has chosen for his or her character. The customization data is stored in relation to the default objects and character design elements found within the game—for example, the player character with the unique identifier 12345 has a nose 1.2 times as long as the default nose; the player character with the unique identifier 67890 has eyes colored blue and hair colored blonde.

The Game Object Library 58 contains geometry, color, and texture data describing the default objects and character design elements used to create customized characters. Examples of these objects and design elements include the geometry, color, and texture information used to represent the different styles of bodies, faces, outfits, weapons, armor, and accessories that a player may utilize in customizing their characters.

An analogy for the relationship between the Player Character Database 56 and the Game Object Library 58 is that of a recipe to a grocery store. The recipe specifies which items are needed from the store and how those items should be modified or manipulated to produce the final product. In this case, the recipe is the data describing the customizations from the Player Character Database 56, the store is the Game Object Library 58, and the final product is the customized character.

The Player History and Statistics Database 60 contains historical information and statistics about characters within the game. Examples of types of historical information that are stored in the database include the tasks, quests, and milestones that the characters accomplished within the game. Examples of types of statistical information that are stored in the database include the character's level, rank, affiliations, strength, number and types of enemies killed, profession, and skills.

Depending on the type of merchandise to be produced, the quality of the data stored in the Game Object Library Database 58 may not be sufficient to produce the desired merchandise to the quality standards that are desired. This may be the case if, for example, only low-resolution textures and geometry data is stored in the Game Object Library database 58 and a high-resolution piece of merchandise is desired. Low-resolution data may be stored in the Game Object Library database 58 to maintain a certain performance level of the game running in real time on a personal computer and to reduce space required to store the data.

In cases when the data from the Game Object Library Database 58 is not acceptable, data is retrieved from the Enhanced Game Object Library Database 62. This database contains high-resolution geometry and texture data and is used to replace the low-resolution geometry and texture data retrieved from the Game Object Library Database 58.

Next, the Data Preparation Process 64 takes the data that was acquired in the Data Acquisition Process 52, and modifies the data to meet the needs of the desired manufacturing process. Modifications are determined based on analyzing the meta-data for each order. The data then undergoes one or more modifications, examples of which may include: refinement, enhancement, transformation, and replacement. Two common modifications include: replacing low-resolution with high-resolution geometry and texture data and, using commonly known graphical techniques and algorithms, smoothing the texture and geometry data. Additional data such as serial numbers and copyright information can also be incorporated into the data at this point.

Once the data has been prepared, the Data Rendering Process 66 submits the data to the appropriate Rendering Device or System 68 by examining the order meta-data. This allows different types of merchandise to be produced using the same fulfillment system as long as the fulfillment system has access to an appropriate type of rendering devices or system.

The Rendering Device or System 68 is specifically anticipated and expected to take on various forms as merchandise fulfillment needs dictate. Examples of some of the forms expected include the following (although this list should not exclude other rendering devices or systems being incorporated under the fulfillment process):

a) Software program that converts 3-dimensional geometry and texture information into a 2-dimensional representation.

b) Hardware device that converts 3-dimensional geometry and texture information into a 2-dimensional representation.

c) Combination of software program(s) and hardware device(s) that converts 3-dimensional geometry and texture information into a 2-dimensional representation.

d) Physical printers including but not limited to the following (and including any drivers or other software needed to provide the necessary inputs to the printer and to control the printers): ink jet printer, laser printer, dye-sublimation printer, ID card printer, printing press and silk screening apparatus.

e) Fabrication machinery including but not limited to the following (and including any drivers or other software needed to provide the necessary inputs to the machinery and to control the machinery): 3D printer, computer controlled milling machinery, laser cutting machinery, water jet machinery, carving machinery, sewing machinery, stitching machinery and embroidery machinery.

The merchandise produced by the Rendering Device or System 68 varies based upon the specific rendering device or system used and the order being fulfilled. Examples of types of merchandise that may be produced include the following (although this list does not exclude other merchandise that may be produced under this process):

a) Image or graphical representation of the customized character in an electronic format (the electronic format may include but not be limited to static, dynamic, interactive, noninteractive, or any combination therein).

b) Image of the customized character printed on a card optionally including personalized information about the customized character and or player.

c) A t-shirt, bumper sticker, stickpin, badge, hat, stationery, pen, plaque, poster, trophy, model, sticker, calendar, cup, flag, banner, jacket, or other merchandise possessing the likeness of the customized character and optionally including personalized information about the customized character and/or player.

d) An action figure or doll possessing the likeness of the customized character.

e) A bust or sculpture possessing the likeness of the customized character and optionally including personalized information about the customized character and/or player.

f) Facial mask possessing the likeness of the customized character.

g) Clothing or accessories resembling those of the customized character.

After the Data Rendering Process 66 and the Rendering Device or System 68 has produced the customized merchandise, the merchandise undergoes the Packaging and Delivery Process 70. As part of this process the merchandise is packaged and delivered to the appropriate party. Methods for packaging and delivery will vary depending on the type of customized merchandise produced and includes the following (although this list should not exclude other types of packaging and delivery processes being utilized under this fulfillment process): electronic delivery (including, but not be limited to, email, FTP, World Wide Web) and other traditional packaging and delivery mechanisms.

Once the customized merchandise has begun the delivery process (for example, being provided to a delivery agent) or has been actually delivered through electronic means, notifications to appropriate parties are provided. Notification information includes but is not limited to invoice information and tracking information of the in-transit merchandise, methods for accessing or retrieving the merchandise, or a simple notice of completion.

In one embodiment of the present invention, the fulfillment system becomes a centralized hub that processes players' orders and produces customized merchandise.

This arrangement offers many "cross-promotional" or "viral" marketing opportunities available to the operator of the fulfillment system to increase orders. For example, when one player belonging to a formal group within the game orders customized merchandise, he can be given the option of inviting the other players belonging to his group to order the same type of merchandise. The fulfillment system contacts each of the members of the group directly or via the game system, informs each member that one of their own group members is ordering merchandise, and offers each of the other members of the group the opportunity to purchase the customized merchandise. Discounts may be offered to increase the incentive. An alternate incentive that may be offered is, if all members of the group order the merchandise, they may each receive a discount, bonus, or special item as part of their order. If the merchandise in question were a collectible trading card then each member of the group may order one card of each member of the group. Thus if 10 players were in the group, they each would receive 10 collectible trading cards—one card of each member within the group. A bonus, such as an extra group card, could be offered if all members of the group completed the order. An alternative promotional bonus could be a display stand or card album.

This strategy, of adding value when processing a group request, is not limited to trading cards and it is not limited to bonus items and discounts. It can easily be applied to other physical merchandise and electronic merchandise as well. For example, when creating images for a hosted Web site, the organizational relationships among the members of the group may be rendered along with the images of the characters to produce an organizational chart. During the Package and Delivery Process 70, this organizational chart could be added to each group member's hosted site. Additionally, each position on the organizational chart could link to the home page of the appropriate individual player as well as provide statistics and descriptions of the player's character. This interconnectedness of Web sites for individuals within a group provides a valuable marketing and advertising opportunity as well as increasing the player's involvement with the game and the retention rate of subscribers.

The centralized hub example embodiment of the present invention creates additional utility by becoming a proxy to deliver merchandise as gifts between members of a group without the members of the group knowing each other's personally identifiable information. This is made possible by having the fulfillment system 42 correlate each group member's customer information, such as their email address or home address, to their in-game character and allowing group members to purchase customized merchandise for each other's in-game characters. The fulfillment system 42 may then use the gift receiver's character information to retrieve the gift receiver's personal delivery information and continue to verify and process the order. During the verification step, criteria such as the costs associated with the delivery of the customized merchandise, the gift receiver's location, or ability or preference as to whether or not he or she will accept gifts, can be considered and the gift order either modified or rejected automatically or manually via interaction with the gift giver and the system, the gift receiver and the system, or between all parties (both gift giver and receiver and the system).

A further extension of the proxy configuration allows a player to offer customized merchandise to other people outside of his or her immediate group, for example through an in-game virtual store. In this scenario, other game players or users of the fulfillment system 42 can browse the customized merchandise of the player that created the store and purchase the customized merchandise of that player. Such customized merchandise could be highly desirable by other players especially if the customized merchandise reflected a high level of achievement within the game or featured content to which the store browser did not have access. For example, the selling player was the only player to find and defeat an extremely rare high level monster and the victory immortalized into a wall poster showing the player fighting and slaying the monster. Most players would only be able to see the rare monster if they purchased the wall poster. Some or all of proceeds from the store could be returned to the selling player, credited to his account, or converted into in-game experience points or in-game currency.

The foregoing merely illustrates the principles of the invention. It will thus be appreciated by those skilled in the art that numerous other arrangements which embody the principles of the invention are thus within its spirit and scope.

What is claimed is:

1. A method for generating customized merchandise based upon an character within a virtual environment, the method comprising:
   receiving, by at least one processor, a request for an article of manufacture from a player of a game in a virtual environment based on a current appearance of a character within the game, the appearance of the entity being changed during play of the game;
   retrieving, by the processor, a merchandise template for a type of article of manufacture from storage based on the request;
   retrieving, by the at least one processor, at least one first data element from a first stored data set based, at least in part, on the merchandise template, wherein the first data set contains a plurality of data elements defining the current appearance of the character within the game for play of the game in the virtual environment and display of the game including the character on a player's display device, the first data set being based, at least in part, on a second stored data set comprising second data elements, at least some of the second data elements having a higher resolution than the first data elements;
   translating, by the at least one processor, the at least one retrieved first data element into at least one merchandise characteristic by, at least in part, replacing at least one of the at least one first data elements by a second data element from the second data set, the second data element having a higher resolution than the first data element; and
   causing manufacture of the article of merchandise, based, at least in part, on the at least one merchandise characteristic, by the at least one processor.

2. The method of claim 1, further comprising:
   receiving the request for the article from within the game.

3. The method of claim 1, wherein the at least one first data element defines at least one attribute chosen from the group consisting of:
   a character race, a character class, a character gender, a character facial appearance, a character body type, a character hair color, a character hairstyle, a character skin tone, a character clothing, a character ability score, a character accessory, a character name, a character action, a character accomplishment and an environment setting.

4. The method of claim 1, wherein the article of merchandise comprises a three-dimensional model of the character.

5. The method of claim 4, comprising causing manufacture of the article of merchandise by a rendering device chosen from the group consisting of:
   a milling machine, a laser cutting machine, a water jet machine, a carving machine, a swing machine, a stitching machine, and an embroidery machine.

6. The method of claim 1, any preceding claim, further comprising:
   purchasing, by the player, the article from a virtual store within the virtual environment.

7. The method of claim 1, comprising receiving the at least one first data element from a game server controlling, at least in part, the virtual environment.

8. The method of claim 1, wherein the article of manufacture is chosen from the group consisting of: a Web site, an image file, a video game, a computer program, and a screensaver.

9. The method of claim 1, comprising receiving the request from the player via the game client, through the virtual environment, or through a game server controlling play of the game in the virtual environment.

10. A system for generating customized merchandise based upon a character within a virtual environment, the system comprising:
- an interface to receive a request for an item of manufacture from a player of a game in a virtual environment based on a current appearance of a character within the game, the appearance of the entity being changed during play of the game, via a network;
- storage storing at least one merchandise template for at least one type of article of manufacture;
- at least one processor configured to:
- receive instructions from at least one player to control the character in the game within the virtual environment;
- change at least one characteristic of the character in the game within the virtual environment based, at least in part, on the instructions;
- cause current characteristics of the character to be stored in the database;
- retrieve a merchandise template for a type of article of manufacture from storage based on the request;
- retrieve at least one first data element from a first stored data set, via the interface, wherein the first stored data set contains a plurality of data elements defining the current appearance of the entity within the game based, at least in part, on the retrieved merchandise template, the first stored data set being for play of the game in the virtual environment and display of the game including the character on a player's display device, the first stored data set being based, at least in part, on a second stored data set comprising second data elements, at least some of the second data element having a higher resolution than the first data elements;
- translate the at least one first data element into at least one merchandise characteristic at least in part, by replacing at least one of the at least one first data elements by a second data element having the higher resolution than the first data element; and
- cause manufacture of an article of merchandise, based, at least in part, on the at least one merchandise characteristic.

11. The system of claim 10, wherein the interface is configured to receive a request from a game server controlling, at least in part, the virtual environment.

12. The system of claim 11, wherein the characteristic relates to at least one of:
- character race, character class, character gender, character facial appearance, character body type, character hair color, character hairstyle, character skin tone, character clothing, character ability score, character accessory, a character name, a character action, a character accomplishment and environment setting.

13. The system of claim 11, wherein the at least one processor is further configured to:
- offer the article for sale from a virtual store within the virtual environment.

14. The system of claim 11, wherein the article of manufacture comprises of a three-dimensional model of the character.

15. The system of claim 14, wherein the at least one processor is configured to cause manufacture of the article of merchandise by a rendering device chosen from the group consisting of:
- a milling machine, a laser cutting machine, a water jet machine, a carving machine, a swing machine, a stitching machine, and an embroidery machine.

16. The system of claim 11, wherein the interface is configured to receive the request from the player via the game client through the virtual environment, through a network, or through a game server controlling play of the game in the virtual environment.

* * * * *